(12) United States Patent
Lv et al.

(10) Patent No.: US 11,042,319 B2
(45) Date of Patent: Jun. 22, 2021

(54) MANAGING STORAGE DEVICES IN STORAGE SYSTEMS (71) Applicant: EMC IP HOLDING COMPANY LLC, Hopkinton, MA (US)

(72) Inventors: Shuo Lv, Beijing (CN); Wenjun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/178,815

(22) Filed: Nov. 2, 2018

(65) Prior Publication Data
US 2019/0138239 A1 May 9, 2019

(51) Int. Cl.
G06F 3/06 (2006.01)
G06F 11/30 (2006.01)

(52) U.S. Cl.
CPC .......... *G06F 3/0653* (2013.01); *G06F 3/061* (2013.01); *G06F 3/0689* (2013.01); *G06F 11/3034* (2013.01)

(58) Field of Classification Search
CPC .. G06F 11/3058; G06F 11/30; G06F 11/3055; G06F 3/0653; G06F 2009/45591; G06F 11/3034; G06F 3/0689; G06F 3/061; G06F 11/3419; G06F 11/1076; G06F 11/0793; G06F 11/3485
See application file for complete search history.

(56) References Cited

U.S. PATENT DOCUMENTS

| 2014/0109086 | A1* | 4/2014 | Mizrahi | G06F 9/45558 718/1 |
| 2015/0074450 | A1* | 3/2015 | Blount | G06F 11/0727 714/6.1 |
| 2015/0302034 | A1* | 10/2015 | Sitaram | G06F 16/22 707/769 |

* cited by examiner

*Primary Examiner* — Reginald G Bragdon
*Assistant Examiner* — Thanh D Vo
(74) *Attorney, Agent, or Firm* — Krishnendu Gupta; Lesley Leonessa (57) ABSTRACT A method is used in detecting slow storage device operations in a storage system. Information regarding a set of storage device operations performed on a storage device in the storage system is monitored in real time. The information is analyzed in real time. A determination is made from the analysis whether the storage device can be identified as a slow storage device. At least one action is performed on the storage system, while the storage system continues to operate, to isolate the slow storage device.

16 Claims, 4 Drawing Sheets

MANAGING STORAGE DEVICES IN STORAGE SYSTEMS

RELATED APPLICATION

This application claim priority from Chinese Patent Application Number CN201711070697.X, filed on Nov. 3, 2017 at the State Intellectual Property Office, China, titled "MANAGING STORAGE DEVICES IN STORAGE SYSTEMS," the contents of which is herein incorporated by reference in its entirety.

BACKGROUND

Technical Field

This application relates to managing storage devices in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level.

There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, and the like) may provide varying degrees of fault tolerance. Further, RAID parity schemes may be utilized to provide error detection during the transfer and retrieval of data across a storage system.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. For example, RAID-5 techniques can be used in connection with a data storage system to protect from a single device failure.

In a particular RAID-5 context, for example, which comprises a storage array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed. The system is then said to be operating in a "degraded" mode since extra processing operations and, accordingly, extra time is required to reconstruct the data in the failed disk sector when access thereto is required.

As described above, data storage systems may utilize a number of different RAID levels and techniques in connection with providing a combination of fault tolerance and/or improved performance for data storage drives. For example, the first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

The above describes various ways disk failures are handled to recover data. However, a slow storage device may actually be worse than a disk failure. If one or more disks are slow in a RAID group, it will result in an overall slow read and write performance in the RAID group. That overall degradation in performance may interrupt business operations.

It will be appreciated from the foregoing that a slow storage device can hinder storage device operations. It is, therefore, desirable to detect slow storage device operations in a storage system, in real time, so that a slow storage device can be isolated before the slow storage device impacts storage device operations.

SUMMARY OF THE INVENTION

A method is used in detecting slow storage device operations in a storage system. The method monitors, in real time, information regarding a set of storage device operations performed on a storage device in the storage system, and analyzes the information in real time. From the analysis, the method determines whether the storage device can be identified as a slow storage device. The method then performs at least one action on the storage system, while the storage system continues to operate, to isolate the slow storage device.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in detecting slow storage device operations in a storage system, which technique may be used to provide, among other things, monitoring, in real time, information regarding a set of storage device operations performed on a storage device in the storage system, analyzing the information in real time, determining, from the analysis, whether the storage device can be identified as a slow storage device, and performing at least one action on the storage system, while the storage system continues to operate, to isolate the slow storage device.

As described herein, in a storage array system, the user data is generally stored in RAID groups organized on storage devices of the storage array systems. Further, performance of a storage system or a storage device of the storage system may be indicated by performance indicators such as throughput and I/O operations per second (IOPS). Generally, a throughput is a measure of the amount of data that can be processed in a specific time. Further, IOPS or Input/Output operations per second is a measure of the total number of storage transactions or operations that are processed through a storage system each second. Further, a storage transaction or a storage operation is generally a request for reading data from a storage system or writing data to the storage system and such request may include accessing data stored on RAID groups or writing data to the RAID groups for performing such requests. Typically, the performance of a storage system is governed by the slowest storage device of the storage system. There are many indicators based on which a storage device may be identified as a slow storage device. One such indicator is a latency which is generally measured in milliseconds (ms) and should be as low as possible. A latency is a measure of the amount of time required to process a single storage transaction or data request or storage operation (e.g., an I/O operation). Further, in a storage system, a latency may refer to how long it takes to find data on a storage device associated with a data request and access that data from the storage device. Further, latency is usually considered in conjunction with an average I/O size, because large I/O operations take longer to process than small I/O operations.

If at least one storage device (e.g., disk drive, hard disk, storage disk drive) becomes slow in performing storage operations in a RAID group, it results into an overall decrease in performance of storage operations (such as read and write operations) in the RAID group. Taken to the extreme, a slow storage device may cause business interruptions to occur due to a single slow storage device impeding the performance of the entire storage system.

Conventionally, a slow storage device may eventually fail, and may slow down the entire storage system prior to failing. Thus, in such a conventional system, not only is the failure of a storage device is a problem that needs to be resolved (i.e., recovery of lost data, rebuilding of the failed storage device), but the effect of the slow storage device on the entire storage system as it impacts the overall performance of the storage system also needs to be addressed. Consequently, in such a conventional system, when a slow storage device goes undetected, not only the performance of the conventional storage system is impacted but when the slow storage device eventually fails, data of the failed storage device becomes unavailable to a user until the data from the failed storage device is recovered resulting into interruptions in access of the data by the user.

Convention technologies do not provide an effective method to detect a slow storage device in real time while the storage system is operating.

By contrast, in at least some implementations in accordance with the technique as described herein, a slow storage device is detected in real time, and isolated in a timely manner to prevent loss of data and/or sluggish performance of the storage system. Thus, in contrast to a conventional system in which a slow storage device reduces the performance of the storage system and may ultimately fail, the current technique provides an ability to dynamically detect a slow storage device in real time, and isolate the slow storage device while the storage system continues to operate, thus mitigating the impact of the slow storage device on the performance of the storage system.

In at least one embodiment of the current technique, the method monitors, in real time, information, such as an input/output (I/O) latency for each storage device operation, where the I/O latency for a storage device operation indicates an amount of time it takes to complete the storage device operation.

In at least one embodiment of the current technique, the method gathers the I/O latency data, and samples the I/O latency data over at least one specified interval.

In at least one embodiment of the current technique, the method applies a heuristic to the sampled I/O latency data to identify the slow storage device. In an example embodiment, the method identifies a normal distribution associated with the input/output latency data. In another example embodiment, the method identifies that a specific percentage of the sampled I/O latency data exceeds a latency threshold.

In at least one embodiment of the current technique, the method avoids performing a rebuild for the storage device identified as the slow storage device on the storage system. In another embodiment of the current technique, the method avoids rebooting the storage system. In yet another embodiment of the current technique, the method avoids reformatting a file system organized on the slow storage device. In yet another embodiment of the current technique, the method avoids failure of the slow storage device in the storage system.

In at least some implementations in accordance with the current technique as described herein, the detection of a slow storage device during storage system operations can provide one or more of the following advantages: dynamically detecting the slow storage device, mitigating the effect the slow storage device may have on the storage system performance, intervening to resolve the problem of the slow storage device in a timely manner, avoiding to reboot the storage system, rebuild the storage device, or reformat the file system, and avoiding the failure of the slow storage device.

It should be noted that the terms "data storage system", "storage system", disk array", and "storage array" have been used interchangeably in this specification. It should also be noted that "storage device" and "storage disk" and "disk" have been used interchangeably in this specification.

Figure 1:
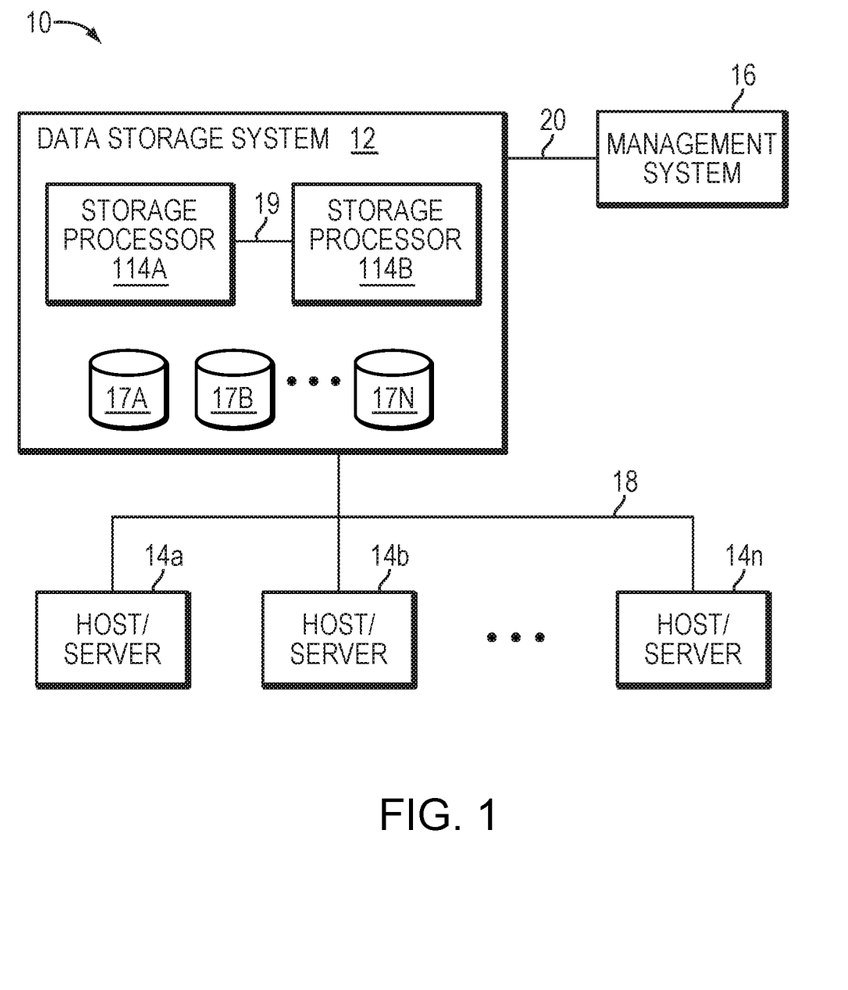
FIGS. 1-2 are examples of an embodiment of a computer system that may utilize the techniques described herein.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX™ or VNXe™ data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX™ or VNXe™ data storage system mentioned above may include two storage processors 114A, 114B for performing processing in connection with servicing requests. Additionally, the two storage processors 114A, 114B may be used in connection with failover processing when communicating with the management system 16.

Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

Storage operations performed in a data storage system 12 may include I/O operations which are received by the data storage system 12 from an external client, such as a host. Depending on the data storage configuration, the single host I/O operation, such as for a write operation, may result in more than one write operation to one or more physical drives on the data storage system. For example, if the host write is directed to a logical device, such as a LUN, having storage provisioned from a RAID group having a RAID-1 mirroring configuration with two physical drives, then a single front end or host I/O to the LUN results in two back-end physical device writes to each of the two mirrored physical devices of the storage system comprising the RAID group.

Figure 2:
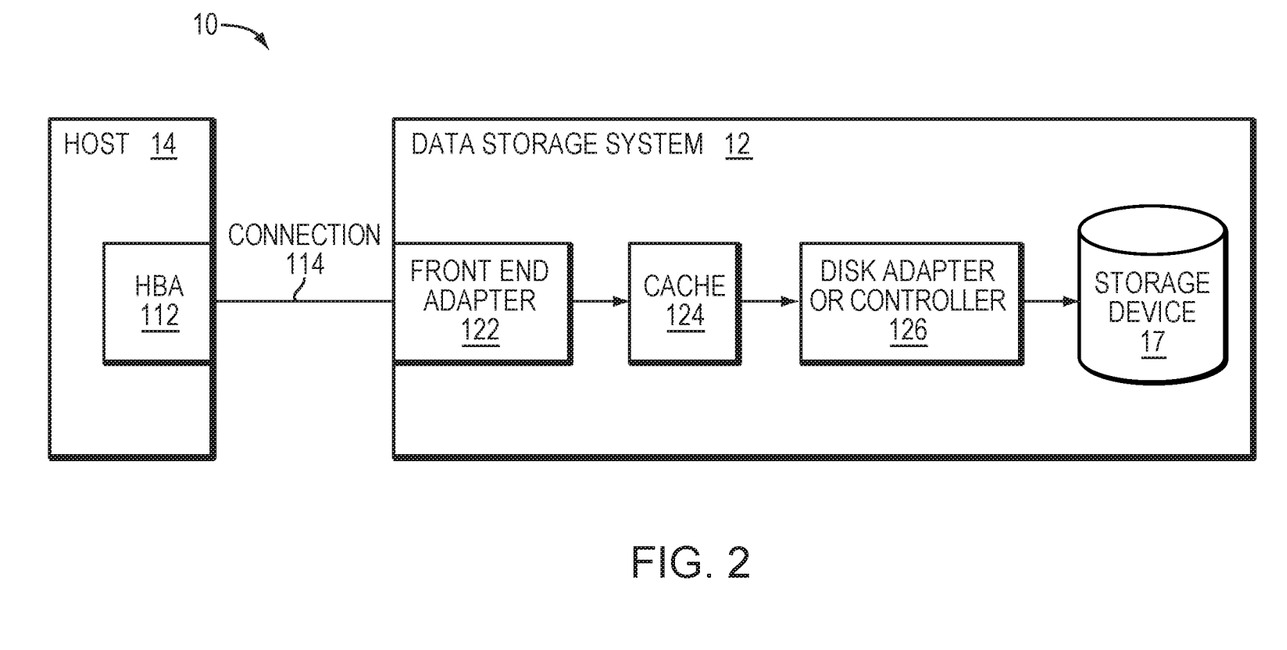

With reference to FIG. 2, shown is an example 10 illustrating components of a system that may be used in an embodiment in accordance with techniques herein. The example 10 includes a simplified view of components of a system as described above. The example 10 includes a host 14 with a Host Bus Adapter ("HBA") 112. The host 14 communicates with data storage system 12 over connection 114. Connection 114 may be, for example, a network connection between the HBA 112 and a front end adapter 122 of the data storage system 12. As described above, a front end adapter 122 may be, for example, a Fibre Channel Adapter ("FA") or other adapter which facilitates host communication. The data storage system 12 also includes a cache 124, a Disk Adapter ("DA") or storage controller 126 and one or more physical storage devices 17 (e.g., rotating disks or solid state devices (SSDs) such as a flash drive).

Components of the data storage system 12, such as a Host Adapter ("HA"), which may communicate with a host may also be referred to as front end components. Within the data storage system 12, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the HAs, and the cache memory 124. An embodiment, for example, may use one or more internal busses and/or communication modules. For example, the cache memory 124 may be used to facilitate data transfers and other communications between the DAs and HAs in a data storage system.

Data storage system 12 may include a plurality of storage devices such as disk devices or volumes included in an arrangement consisting of n rows of disks or more generally, data storage devices, 17a-17n. In this arrangement, each row of disks may be connected to a disk adapter ("DA") or director responsible for the backend management of operations to and from a portion of the disks 17. In a data storage system such as by EMC Corporation, a backend DA may also be referred to as a disk controller. The DA may perform operations such as reading data from, and writing data to, the physical devices which are serviced by the DA.

The host 14 may issue an I/O operation to the data storage system over connection 114. For example, the host may issue a write operation to write data to a portion of storage device 17. In one embodiment, the data of the write operation may first be stored in cache 124 and then de-staged at a later point in time by DA 126 to the physical storage device 17. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 14. Thus, a read resulting in a cache hit may be serviced without having to access the physical storage device 17 for the data. If the requested data is not in cache 124, the data is retrieved by the DA 126 from the storage device 128, stored in cache 124, and then returned by the front end adapter 122 to the host 14.

Examples of cache 124 may include but are not limited to a volatile, solid-state, cache memory system (e.g., a dynamic RAM cache memory system) and/or a non-volatile, solid-state, cache memory system (e.g., a flash-based, cache memory system).

As described in more detail in following paragraphs and figures and with reference to FIG. 1, each of the SPs 114A, 114B may have its own instance of a data model, such as a object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like.

Figure 3:
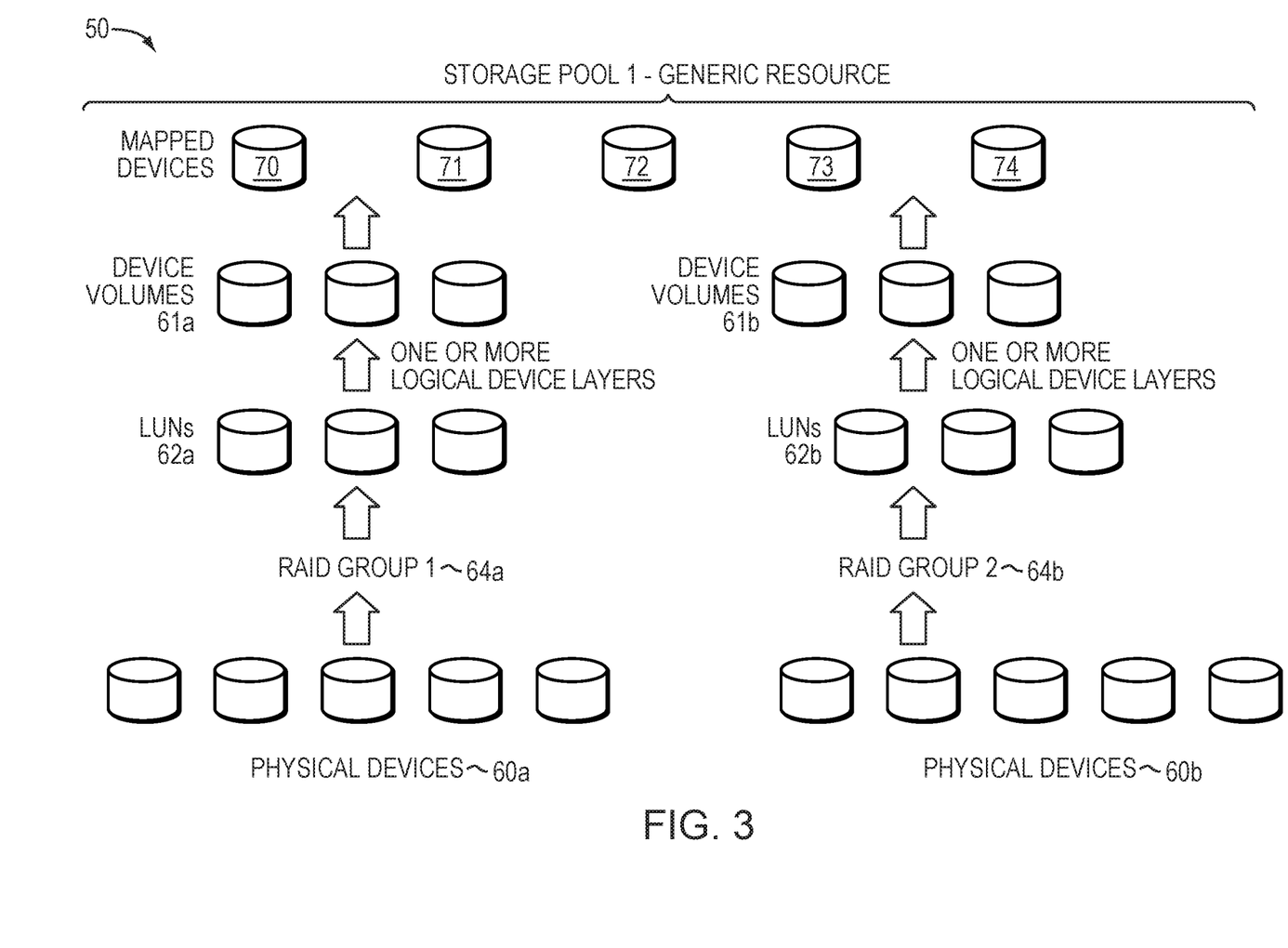
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. A disk may be a physical disk within the storage system. A LUN may be a logical unit number which is an identifier for a Logical Unit. Each slice of data may have a mapping to the location of the physical drive where it starts and ends.

Figure 4:
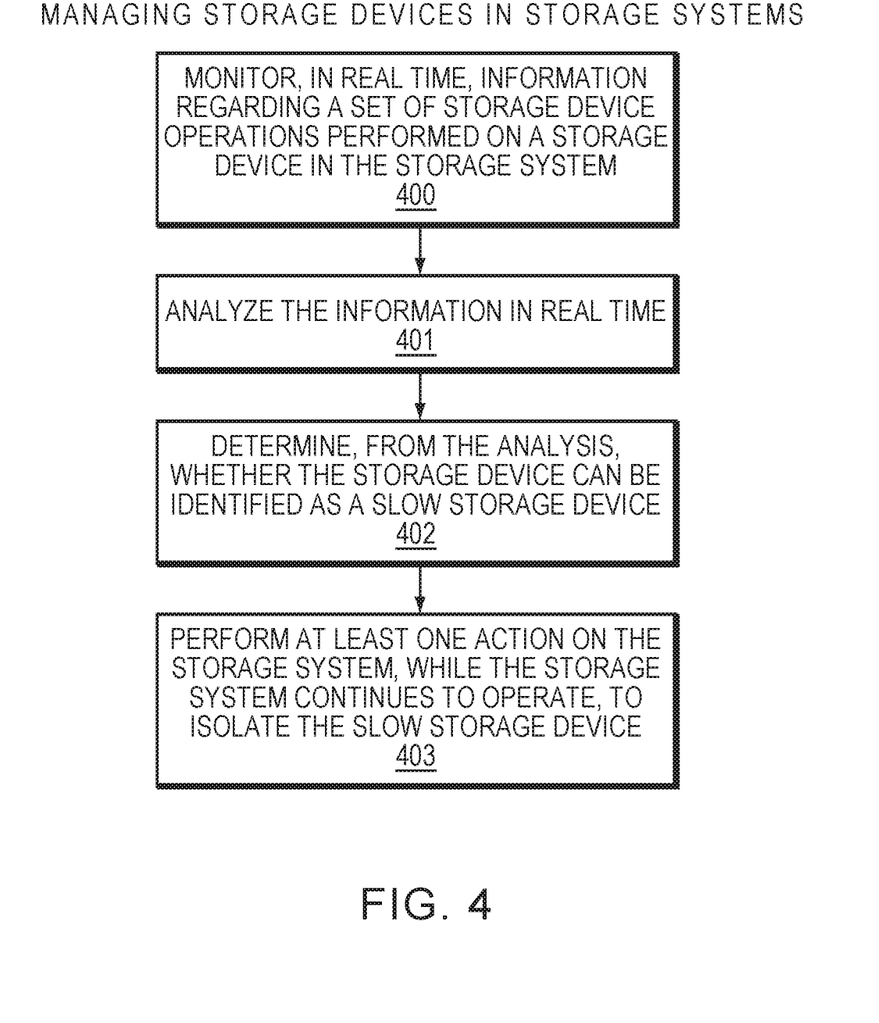
FIG. 4 is a flow diagram illustrating processes that may be used in connection with techniques herein.

Referring to FIG. 4, shown is a more detailed flow diagram illustrating managing storage devices in storage systems. With reference also to FIGS. 1-3, information regarding a set of storage device operations performed on a storage device in the storage system is monitored, in real time (step 400). In at least one embodiment of the technique, the information regarding the set of storage device operations performed on the storage device is monitored continuously. For example, the information regarding the set of storage device operations includes an input/output (I/O) latency for each storage device operation, where the I/O latency for a storage device operation indicates an amount of time it takes to complete the storage device operation.

In an example embodiment, monitoring of I/O latency is implemented in a device mapper component of a storage system which maps physical block devices onto higher-level virtual, logical, or mapped block devices. Thus, when modifications are made to the I/O latency monitoring logic included in the device mapper component, the modifications are made only in the device mapper component thereby avoiding global changes to the whole I/O stack of the storage system. Thus, monitoring of I/O latency is not implemented in the kernel of the operating system. (The kernel connects the application software to the hardware of a computer.)

In at least one embodiment of the technique, the I/O latency data for the set of storage device operations is monitored, and a sample of such I/O latency data is gathered at least one specified time interval. In an example embodiment, the method continuously monitors disk I/O latency data, and continuously samples such I/O latency data for the storage device at a specific time interval. In another example embodiment, each I/O data is sampled. In yet another example embodiment, the I/O data is continuously sampled for at least one storage device in the storage system.

In at least one embodiment of the technique, the information is analyzed in real time (step 401). For example, a heuristic is applied to the sampled I/O latency data to identify the slow storage device. In at least one embodiment of the technique, when a heuristic is applied, a normal distribution associated with the I/O latency data is identified. In an example embodiment, the normal distribution may be detected using, for example, a statistical test, such as the Anderson Darling test. In this example embodiment, the statistical test may be applied to the sampled I/O latency data to determine whether the sampled I/O latency data follows a normal distribution curve when plotted. It should be noted that any technique that identifies a normal distribution within the sampled I/O latency data may be used.

In at least one embodiment of the technique, if the sampled I/O latency data for a storage device conforms to a normal distribution and a specific percentage of the sampled I/O latency data exceeds a latency threshold, the storage device is identified as a slow storage device. For example, most I/O latencies on a slow storage device are greater than 10 milliseconds, even more I/O latencies for such slow storage device are greater than 300 milliseconds. In this example embodiment, 300 milliseconds and 80% of all of the I/O requests for a particular storage device may be threshold values to determine whether the storage device is a slow storage device. Thus, a latency of 300 milliseconds may indicate a potentially slow storage device. If 85% of all of the I/O requests for the storage device take longer than 300 milliseconds, the method may identify the storage device as a slow storage device.

In an example embodiment, the method may apply the heuristic to detect a normal distribution within the sampled I/O latency data and/or identify that a specific percentage of the sampled I/O latency data exceeds a latency threshold. These two heuristics tests may be applied singularly, or together, and may be applied in any order. Based on the outcome of the real time analysis of the I/O latency data, the method determines whether the storage device can be identified as a slow storage device (step 402). Thus, in at least one embodiment of the technique, the slow storage device is dynamically detected while the storage system continues to operate and such slow storage device is detected before such slow storage device fails.

In at least one embodiment of the technique, the method performs at least one action on the storage system, while the storage system continues to operate, to isolate the slow storage device. There are several advantages to embodiments disclosed herein. For example, while the slow storage device is isolated, the storage system continues to operate. Thus, in at least one embodiment of the technique, rebooting the storage system is avoided. In at least one other embodiment of the technique, performing a rebuild for the storage device identified as the slow storage device on the storage system is avoided because the storage device is detected as the slow storage device in a timely manner before the slow storage device fails. In yet at least one other embodiment of the technique, reformatting a file system organized on the slow storage device is avoided because the storage device is detected as the slow storage device in a timely manner thereby avoiding the need to reformat the file system when the slot storage device eventually fails. Further, in yet at least one other embodiment of the technique, failure of the slow storage device in the storage system is also avoided by detecting a storage device as the slow storage device in a timely manner.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in detecting slow storage device operations in a storage system, the method comprising:
monitoring in a device mapper, in real time, information regarding a set of storage device operations performed on a storage device in the storage system, wherein the device mapper maps physical block devices onto higher-level virtual, logical, or mapped block devices;
analyzing the information in real time;
applying a heuristic to sampled I/O latency data to identify the slow storage device;
identifying that a specific percentage of the sampled I/O latency data exceeds a latency threshold;
determining, from the analysis, whether the storage device can be identified as a slow storage device to mitigate an effect the slow storage device has on storage system performance; and
performing at least one action on the storage system, while the storage system continues to operate, to isolate the slow storage device.

2. The method of claim 1, wherein the information regarding the set of storage device operations includes an input/output (I/O) latency for each storage device operation, wherein the I/O latency for a storage device operation indicates an amount of time it takes to complete the storage device operation.

3. The method of claim 2, further comprising:
gathering I/O latency data for the set of storage device operations; and
sampling the I/O latency data over at least one specified interval.

4. The method of claim 3, wherein applying the heuristic to the input/output latency data comprises:
identifying a normal distribution associated with the input/output latency data.

5. The method of claim 1, wherein performing the at least one action on the storage system, comprises:
avoiding to perform a rebuild for the storage device identified as the slow storage device on the storage system.

6. The method of claim 1, wherein performing the at least one action on the storage system comprises:
avoiding to reboot the storage system.

7. The method of claim 1, wherein performing the at least one action on the storage system comprises:
avoiding to reformat a file system organized on the slow storage device.

8. The method of claim 1, wherein performing the at least one action on the storage system comprises:
avoiding failure of the slow storage device in the storage system.

9. A system for use in detecting slow storage device operations in a storage system, the system comprising a processor configured to:
monitor in a device mapper, in real time, information regarding a set of storage device operations performed on a storage device in the storage system, wherein the device mapper maps physical block devices onto higher-level virtual, logical, or mapped block devices;
analyze the information in real time;
apply a heuristic to sampled I/O latency data to identify the slow storage device;
identify that a specific percentage of the sampled I/O latency data exceeds a latency threshold;
determine, from the analysis, whether the storage device can be identified as a slow storage device to mitigate an effect the slow storage device has on storage system performance; and
perform at least one action on the storage system, while the storage system continues to operate, to isolate the slow storage device.

10. The system of claim 9, wherein the information regarding the set of storage device operations includes an input/output (I/O) latency for each storage device operation, wherein the I/O latency for a storage device operation indicates an amount of time it takes to complete the storage device operation.

11. The system of claim 10, wherein the processor is further configured to:
gather I/O latency data for the set of storage device operations; and
sample the I/O latency data over at least one specified interval.

12. The system of claim 11, wherein the processor configured to apply a heuristic to the sampled I/O latency data to identify the slow storage device is further configured to:
identify a normal distribution associated with the input/output latency data.

13. The system of claim 9, wherein the processor configured to perform the at least one action on the storage system is further configured to:
avoid performing a rebuild for the storage device identified as the slow storage device on the storage system.

14. The system of claim 9, wherein the processor configured to perform the at least one action on the storage system is further configured to:
avoid rebooting the storage system.

15. The system of claim 9, wherein the processor configured to perform the at least one action on the storage system is further configured to:
avoid reformatting a file system organized on the slow storage device.

16. The system of claim 9, wherein the processor configured to perform the at least one action on the storage system is further configured to:
avoid failure of the slow storage device in the storage system.

* * * * *